US011301473B1

(12) United States Patent
Swain

(10) Patent No.: US 11,301,473 B1
(45) Date of Patent: Apr. 12, 2022

(54) DATASET OVERLAP QUERY SYSTEM

(71) Applicant: SAS Institute Inc., Cary, NC (US)

(72) Inventor: Pradeep Kumar Swain, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/529,483

(22) Filed: Nov. 18, 2021

Related U.S. Application Data

(60) Provisional application No. 63/212,544, filed on Jun. 18, 2021, provisional application No. 63/246,086, filed on Sep. 20, 2021.

(51) Int. Cl.
*G06F 16/2455* (2019.01)

(52) U.S. Cl.
CPC .............................. *G06F 16/2455* (2019.01)

(58) Field of Classification Search
None
See application file for complete search history.

(56) References Cited

U.S. PATENT DOCUMENTS

| | | | |
|---|---|---|---|
| 6,243,710 B1 * | 6/2001 | DeMichiel | G06F 16/2315 707/797 |
| RE42,577 E | 7/2011 | Blume et al. | |
| 10,210,246 B2 * | 2/2019 | Stojanovic | G06Q 30/0631 |
| 10,277,491 B2 | 4/2019 | Pugh et al. | |
| 10,445,062 B2 * | 10/2019 | Oberbreckling | G06F 16/9535 |
| 10,650,012 B1 * | 5/2020 | Wroblewski | G06F 16/245 |
| 11,068,453 B2 | 7/2021 | Griffith | |
| 2007/0282915 A1 * | 12/2007 | Vosshall | G06F 16/27 |
| 2010/0318545 A1 * | 12/2010 | Handy | G06F 16/2455 707/759 |
| 2015/0081718 A1 * | 3/2015 | Schmidt | G06F 16/31 707/755 |
| 2015/0242967 A1 | 8/2015 | Shsh | |
| 2016/0162543 A1 * | 6/2016 | Gustafson | G06F 16/24534 707/769 |
| 2019/0146970 A1 * | 5/2019 | Chamieh | G06F 16/9024 707/718 |

(Continued)

OTHER PUBLICATIONS

Charbit et al. "A Note on Computing Set Overlap Classes," arXiv:0711.4573v1 [cs.DS] Nov. 28, 2007.

(Continued)

*Primary Examiner* — Christopher J Raab
(74) *Attorney, Agent, or Firm* — Bell & Manning, LLC

(57) ABSTRACT

A computing device responds to a membership overlap query. A list of unique member identifiers included in a plurality of datasets is created. A list of datasets of the plurality of datasets is defined for each unique member identifier. Each dataset included in the list of datasets includes a unique member associated with a respective unique member identifier. A unique list of datasets is defined from each list of datasets. A number of occurrences of each unique list of datasets is determined. A number of datasets included in each unique list of datasets is determined. Intersection data is created that includes a dataset list of each unique list of datasets in association with the number of occurrences of each respective, unique list of datasets and with the number of datasets included in each respective, unique list of datasets. An overlap response is determined using the created intersection data.

30 Claims, 2 Drawing Sheets

(56) References Cited

U.S. PATENT DOCUMENTS

2020/0218764 A1* 7/2020 Moore .............. G06F 16/2471

OTHER PUBLICATIONS

Sejong Oh, "A new dataset evaluation method based on category overlap," *Computers il Biology and Medicine*, 41 (2011) 115-122.
Algorithm to match sets with overlapping members—Stack Overflow, https://stackoverflow.com/questions/22379907/algorithm-to-match-sets-with-overlapping-members, Mar. 2014.
Boros et al., "Dealing with overlap and imbalance: a new metric approach," *Pattern Anal Applic* (2018) 21:381-395.
Wang et al., "Efficient Test and Visualization of Multi-Set Intersections" *Scientific Reports 5*, Article No. 16923 Nov. 25, 2015.
Pastore et al., "Measuring Distribution Similarities Between Samples: A Distribution-Free Overlapping Index," *Frontiers in Psychology*, May 2019, vol. 10, Article 1089.
Jaccard index—Wikipedia, last edited Aug. 27, 2021, retrieved from https://en.wikipedia.org/w/index.php?title=Jaccard_index&oldid=1040991564.
Wang et al., Multi-set Intersection Analysis Using SuperExactTest, https://mran.microsoft.com/snapshot/2017-06-08/web/packages/SuperExactTest/vignettes/set_html.html, May 5, 2017.
Python—Percentage Overlap of Two Lists—Stack Overflow, https://stackoverflow.com/questions/29929074percentaqe-overlap-of-two-lists, Apr. 2015.
Goldberg et al., "Measuring similarity Between sets of Overlapping Clusters," Copyright 2010, Association for the Advancement of Artificial Intelligence.
Wang et al, "Package SuperExactTest,", Exact Test and Visualization of Multi-Set Intersections, Jun. 21, 2019.
Sumit Jain, "Find the sum of overlapping elements in two sets," Jan. 4, 2020, Tutorial Horizon.

* cited by examiner

DATASET OVERLAP QUERY SYSTEM

CROSS-REFERENCE TO RELATED APPLICATIONS

The present application claims the benefit of and priority under 35 U.S.C. § 119(e) to U.S. Provisional Patent Application No. 63/212,544 filed on Jun. 18, 2021, and to U.S. Provisional Patent Application No. 63/246,086 filed on Sep. 20, 2021, the entire contents of which are hereby incorporated by reference.

BACKGROUND

In membership overlap query processing, a query determines whether and possibly to what extent members in a plurality of datasets overlap. When a large number of datasets with possibly large numbers of members are queried, a response to such queries can challenge a database or analytic engine because existing solutions use membership details with multiple passes of each dataset to determine a response to each query.

SUMMARY

In an example embodiment, a non-transitory computer-readable medium is provided having stored thereon computer-readable instructions that, when executed by a computing device, cause the computing device to respond to a membership overlap query. A list of unique member identifiers included in a plurality of datasets is created. A list of datasets of the plurality of datasets is defined for each unique member identifier of the created list of unique member identifiers. Each dataset included in the list of datasets for each respective unique member identifier includes a respective unique member associated with a respective unique member identifier. A unique list of datasets is defined from each list of datasets defined for the created list of unique member identifiers. A number of occurrences of each defined unique list of datasets is determined. A number of datasets included in each unique list of datasets is determined. Intersection data is created that includes a dataset list of each defined unique list of datasets in association with the determined number of occurrences of each respective, defined unique list of datasets and with the determined number of datasets included in each respective, defined unique list of datasets. An overlap response to a member overlap query related to the plurality of datasets is determined using the created intersection data. The determined overlap response is output.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to respond to a membership overlap query.

In an example embodiment, a method of responding to a membership overlap query is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A membership query application 122 determines a response to a membership overlap query by creating an intersection dataset from data in a plurality of datasets to be analyzed. Membership query application 122 thereby provides a much faster response determination time than using current methods.

Figure 1:
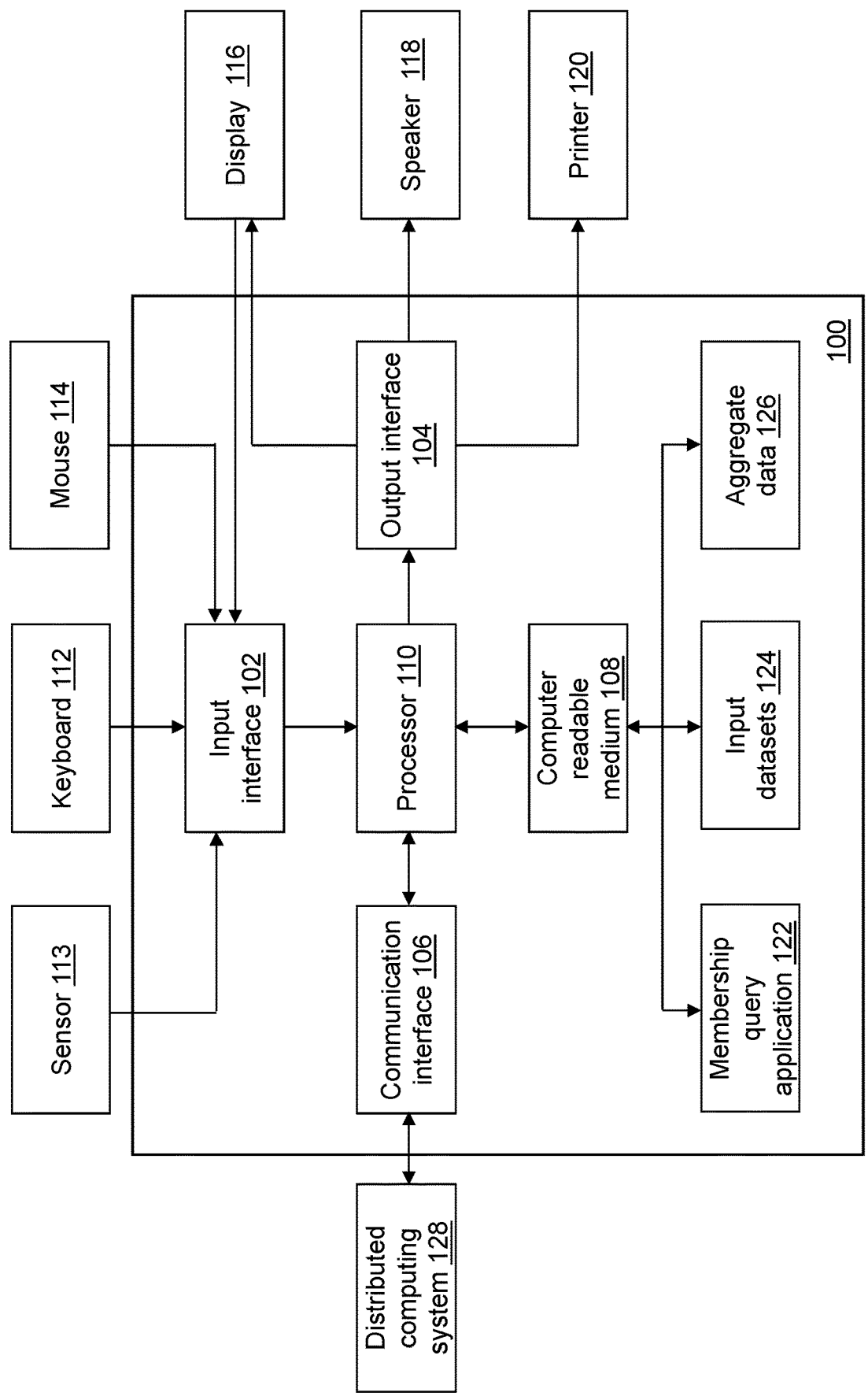
FIG. 1 depicts a block diagram of a membership query device in accordance with an illustrative embodiment.

Referring to FIG. 1, a block diagram of a membership query device 100 is shown in accordance with an illustrative embodiment. Membership query device 100 may include an input interface 102, an output interface 104, a communication interface 106, a non-transitory computer-readable medium 108, a processor 110, membership query application 122, input datasets 124, and aggregate data 126. Fewer, different, and/or additional components may be incorporated into membership query device 100.

Input interface 102 provides an interface for receiving information from the user or another device for entry into membership query device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into membership query device 100 or to make selections presented in a user interface displayed on display 116.

The same interface may support both input interface 102 and output interface 104. For example, display 116 comprising a touch screen provides a mechanism for user input and for presentation of output to the user. Membership query device 100 may have one or more input interfaces that use the same or a different input interface technology. The input interface technology further may be accessible by membership query device 100 through communication interface 106.

Output interface 104 provides an interface for outputting information for review by a user of membership query device 100 and/or for use by another application or device. For example, output interface 104 may interface with various output technologies including, but not limited to, display 116, a speaker 118, a printer 120, etc. Membership query device 100 may have one or more output interfaces that use the same or a different output interface technology. The output interface technology further may be accessible by membership query device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Membership query device 100 may have one or more communication interfaces that use the same or a different communication interface technology. For example, membership query device 100 may support communication using an Ethernet port, a Bluetooth antenna, a telephone jack, a USB port, etc. Data and/or messages may be transferred between membership query device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Membership query device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Membership query device 100 also may have one or more drives that support the loading of a memory media such as a CD, DVD, an external hard drive, etc. One or more external hard drives further may be connected to Membership query device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Membership query device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Membership query application 122 may perform operations associated with responding to an overlap query related to input datasets 124. Some or all of the operations described herein may be embodied in membership query application 122. The operations may be implemented using hardware, firmware, software, or any combination of these methods.

Referring to the example embodiment of FIG. 1, membership query application 122 is implemented in software (comprised of computer-readable and/or computer-executable instructions) stored in computer-readable medium 108 and accessible by processor 110 for execution of the instructions that embody the operations of membership query application 122. Membership query application 122 may be written using one or more programming languages, assembly languages, scripting languages, etc. Membership query application 122 may be integrated with other analytic tools. As an example, membership query application 122 may be part of an integrated data analytics software application and/or software architecture such as that offered by SAS Institute Inc. of Cary, N.C., USA. Merely for illustration, membership query application 122 may be implemented using or integrated with one or more SAS software tools such as Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS® Econometrics, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Membership query application 122 may be implemented as a Web application. For example, membership query application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input datasets 124 include a plurality of datasets, where each dataset of the plurality of datasets may include, for example, a plurality of rows and a plurality of columns. The plurality of rows may be referred to as observation vectors or records (observations), and the columns may be referred to as variables. In an alternative embodiment, each dataset may be transposed. The plurality of variables defines a vector $x_i$ for each observation vector i=1, 2, . . . , $N_k$, k=1, . . . , $N_D$, where $N_k$ is a number of the observation vectors included in each respective dataset, and $N_D$ is a number of datasets included in the plurality of datasets. Each vector $x_i$ includes a value $x_{i,j}$ for each variable j=1, =1, . . . , $N_{v,k}$, k=1, . . . , $N_D$, where $N_{v,k}$ is a number of the plurality of variables included in each respective dataset.

Each dataset of the plurality of datasets may include different numbers of observation vectors with the same or different pluralities of variables.

Sensor 113 may measure a physical quantity in an environment to which sensor 113 is associated and generate a corresponding measurement datum that may be associated with a time that the measurement datum is generated. The measurement datum may be stored in one or more datasets of the input datasets 124. Illustrative sensors include a pressure sensor, a temperature sensor, a position or location sensor, a voltage sensor, a current sensor, a frequency sensor, a humidity sensor, a dewpoint sensor, etc. that may be mounted to various components used as part of a system.

One or more datasets of the input datasets 124 may include data captured as a function of time for one or more physical objects. The data stored may be captured at different time points, periodically, intermittently, when an event occurs, etc. One or more datasets of the input datasets 124 may include data captured at a high data rate such as 200 or more observation vectors per second for one or more physical objects. One or more columns may include a time and/or date value. One or more datasets of the input datasets 124 may include data captured under normal and abnormal operating conditions of the physical object.

The data stored in input datasets 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, the data stored may be generated as part of the Internet of Things (IoT), where things (e.g., machines, devices, phones, sensors) can be connected to networks and the data from these things collected and processed within the things and/or external to the things before being stored in a dataset of the input datasets 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in each dataset.

The data stored in input datasets 124 may include any type of content represented in any computer-readable format such as binary, alphanumeric, numeric, string, markup language, etc. The content may include textual information, numeric information, etc. that further may be encoded using various encoding techniques as understood by a person of skill in the art.

Input datasets 124 may be stored on computer-readable medium 108 and/or on one or more computer-readable media of distributed computing system 128 and accessed by membership query device 100 using communication interface 106 and/or input interface 102. Input datasets 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input datasets 124 may be stored using various data structures as known to those skilled in the art including one or more files of a file system, a relational database, one or more tables of a system of tables, a structured query language database, etc. on membership query device 100 or on distributed computing system 128.

Membership query device 100 may coordinate access to each dataset that is distributed across distributed computing system 128 that may include one or more computing devices. For example, each dataset of input datasets 124 may be stored in one or more cubes distributed across a grid of computers as understood by a person of skill in the art. As another example, each dataset of input datasets 124 may be stored in one or more multi-node Hadoop® classes. For instance, Apache™ Hadoop® is an open-source software framework for distributed computing supported by the Apache Software Foundation. As another example, each dataset of input datasets 124 may be stored in one or more clouds of computers and accessed using cloud computing technologies, as understood by a person of skill in the art. The SAS® LASR™ Analytic Server may be used as an analytic platform to enable multiple users to concurrently access data stored in each dataset. The SAS Viya open, cloud-ready, in-memory architecture also may be used as an analytic platform to enable multiple users to concurrently access data stored in input datasets 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
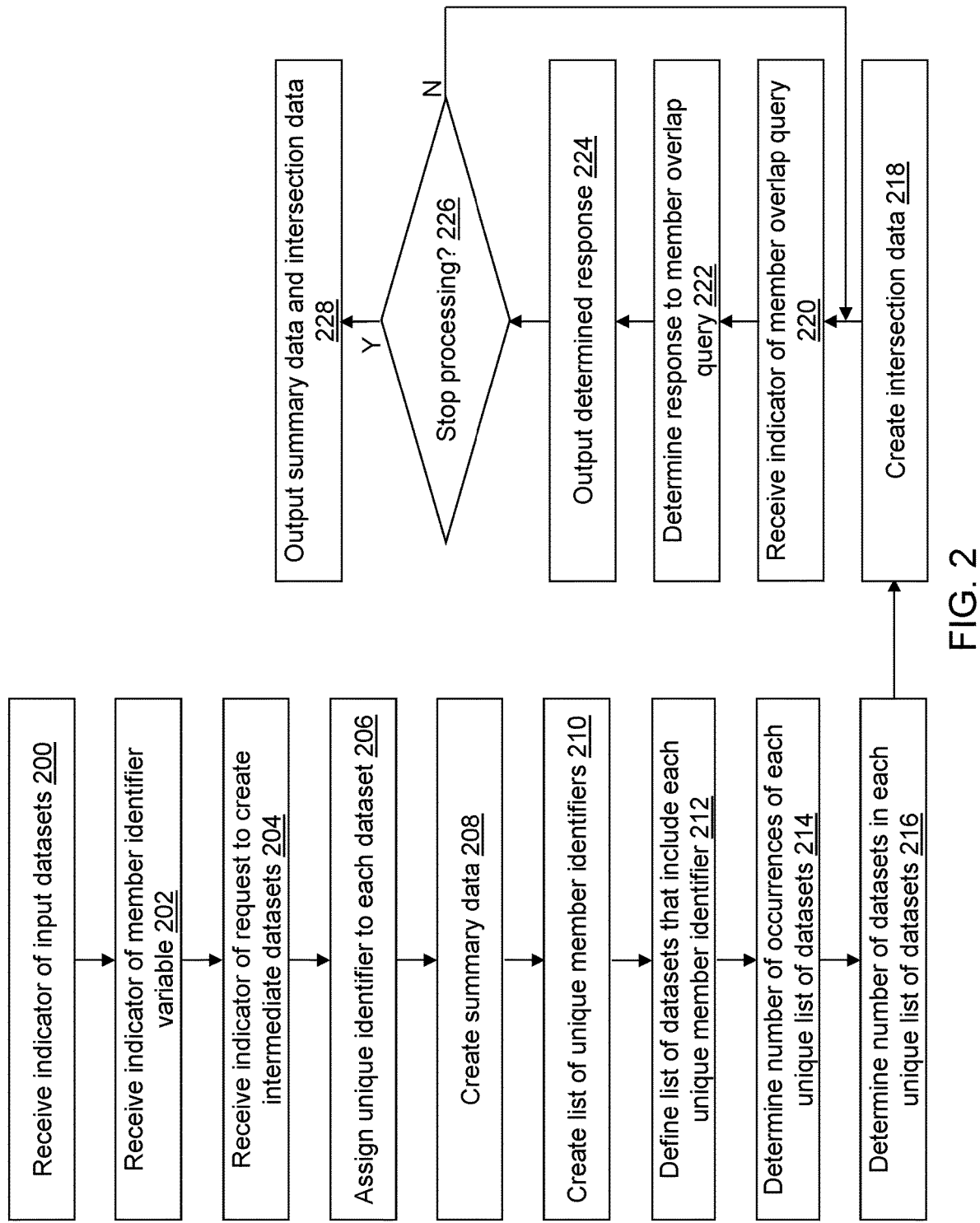
FIG. 2 depicts a flow diagram illustrating examples of operations performed by a membership query application of the membership query device of FIG. 1 in accordance with an illustrative embodiment.

Referring to FIG. 2, example operations associated with membership query application 122 are described. Additional, fewer, or different operations may be performed depending on the embodiment of membership query application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute membership query application 122, which causes presentation of a first user interface window, which may include a plurality of menus and selectors such as drop-down menus, buttons, text boxes, hyperlinks, etc. associated with membership query application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by membership query application 122. Some of the operational flows further may be performed in parallel, for example, using a plurality of threads and/or a plurality of computing devices such as may be included in distributed computing system 128.

Referring to FIG. 2, in an operation 200, a first indicator may be received that indicates each dataset of input datasets 124. For example, the first indicator indicates a location and a name of each dataset. As an example, the first indicator may be received by membership query application 122 after selection from a user interface window or after entry by a user into a user interface window.

In an operation 202, a second indicator may be received that indicates a member identifier (ID) variable to use from each dataset of input datasets 124. For example, the second indicator may indicate a column number or a column name in which the member ID is stored in each respective dataset of input datasets 124. In some cases, the member ID may be stored in the same column of each dataset. As another example, the second indicator may indicate a member ID variable name that is included in a column in a first row of each dataset to identify the member ID variable in each dataset. A member ID value is included in the column of each dataset indicated using the second indicator. The member ID value is unique to each unique member of input datasets 124 and is commonly used across each dataset of input datasets 124 so that the member ID value can be used to match members of input datasets 124 that represent the same member. Each member ID may be associated with data captured for an entity, a person, an object such as a car, a house, etc.

In an operation 204, a third indicator may be received that indicates a request to create intermediate datasets from input datasets 124. As an example, the third indicator may be received by membership query application 122 after selection from a user interface window or after entry by a user into a user interface window. In an alternative embodiment, the third indicator may not be received and creation of the intermediate datasets may proceed automatically.

In an operation 206, a unique dataset ID may be assigned to each dataset of input datasets 124. For example, each dataset may be assigned a unique numeric value $D_i$=i, i=1, . . . , $N_D$. The unique dataset ID may be numeric, textual, alphanumeric, etc. and may further be stored in association with a name or name/location of each respective dataset indicated in operation 200.

In an operation 208, summary data may be created that includes a number of unique members for which data is stored in each respective dataset of input datasets 124 that is stored in association with the unique dataset ID. The number of observation vectors $N_k$, k=1, . . . , $N_D$ may indicate the number of unique members $N_{m,k}$, k=1, . . . , $N_D$ if each member is only included in each dataset once. For example, the following SQL code may be used to create the summary data create table dataset list as
select dataset_id,
count(*) as member_count
from membership_all group by 1;

where dataset_id indicates the unique dataset ID, member_count is the number of unique members $N_{m,k}$. For example, a virtual dataset may be created that is a union of the unique member IDs from all of the datasets included in input dataset 124 that can be named membership_all.

In an operation 210, a list of unique member IDs may be created using the member ID variable indicated for each dataset of input datasets 124.

In an operation 212, a list of datasets that include each unique member ID may be defined for each unique member ID.

In an operation 214, a number of occurrences of each unique list of datasets is determined from the list of datasets defined for each unique member ID.

In an operation 216, a number of datasets included in each unique list of datasets is determined.

In an operation 218, intersection data may be created that includes the number of occurrences of each unique list of datasets and the number of datasets included in each unique list of datasets in association with a respective unique list of datasets.

Operations 210 through 218 may be executed concurrently to create the intersection data. For example, the Presto SQL code below generates creation of the intersection data by applying the logic of operations 210 through 218.

create table intersection data as
select dataset_group, count(user_id) as unique_member_count, dataset_group_size, cardinality(dataset_group) as dataset_group_size from (select user_id, array_sort (array_agg(dataset_id)) as dataset_group from membership_all group by 1) agg group by seg_group;

where user_id indicates the unique member ID,

For illustration, input datasets 124 includes 10 datasets simplified to only list the unique member ID included in each respective dataset:
A=[a,b,c,a1,b1,c1,a2,b2,c2,k]
B=[a,b,d,e,k]
C=[b,c,d]
D=[e,f]
E=[a,b,e,k]
F=[e,f,g]
G=[e,g,h]
H=[q,r,s,t]
I=[m,n]
J=[c,d,e,f]

Again, the remaining variable values of the observation vector associated with each unique member ID are not shown for simplicity. The unique dataset IDs are A-J. The unique member IDs are a, b, c, a1, b1, c1, a2, b2, c2, k, d, e, f, g, h, q, r, s, t, m, n. In operation 208, the number of unique members for which data is stored in each respective dataset of input datasets 124 is determined as shown in Table 1 below.

TABLE 1

| Dataset ID | Number of unique members |
|---|---|
| A | 10 |
| B | 5 |
| C | 3 |
| D | 2 |
| E | 4 |
| F | 3 |
| G | 3 |
| H | 4 |
| I | 2 |
| J | 4 |

In operation 212, the list of datasets that include each unique member ID may be defined for each unique member ID as shown in Table 2 below.

TABLE 2

| Unique member ID | List of datasets |
|---|---|
| a | A, B, E |
| b | A, B, C, E |
| c | A, C, J |
| a1 | A |
| b1 | A |
| c1 | A |
| a2 | A |
| b2 | A |
| c2 | A |
| k | A, B, E |
| d | B, C, J |

TABLE 2-continued

| Unique member ID | List of datasets |
|---|---|
| e | B, D, E, F, G, J |
| f | D, F, J |
| g | F, G |
| h | G |
| q | H |
| r | H |
| s | H |
| t | H |
| m | I |
| n | I |

In operation 214, the number of occurrences of each unique list of datasets is determined across all of the unique member IDs as shown in Table 3 below.

TABLE 3

| List of datasets | Number of occurrences |
|---|---|
| A, B, E | 2 |
| A, B, C, E | 1 |
| A, C, J | 1 |
| A | 6 |
| B, C, J | 1 |
| B, D, E, F, G, J | 1 |
| D, F, J | 1 |
| F, G | 1 |
| G | 1 |
| H | 4 |
| I | 2 |

In operation 216, the number of datasets included in each unique list of datasets is determined as shown in Table 4 below.

TABLE 4

| List of datasets | Number of occurrences | Number of datasets |
|---|---|---|
| A, B, E | 2 | 3 |
| A, B, C, E | 1 | 4 |
| A, C, J | 1 | 3 |
| A | 6 | 1 |
| B, C, J | 1 | 3 |
| B, D, E, F, G, J | 1 | 6 |
| D, F, J | 1 | 3 |
| F, G | 1 | 2 |
| G | 1 | 1 |
| H | 4 | 1 |
| I | 2 | 1 |

The created intersection dataset includes the parameters shown in Table 4.

In an operation 220, an indicator is received of a member overlap query using the created intersection data and/or the created summary data.

In an operation 222, a response to the member overlap query is determined. For example, the member overlap query is submitted to a database or analytic engine that executes the query with the specified data and returns the response. Illustrative database engines include, Presto Distributed SQL, Mysql, PostgresQL, Redshift, Apache Spark SQL, Pandas dataframe, etc. as understood by a person of skill in the art. The member overlap query may be defined specific to a database engine.

In an operation 224, the determined response is output. For illustration, the determined response may be received from the database or analytic engine and presented on display 116, written to a file stored on computer-readable medium 108, printed on printer 120, converted to a voice response and played through speaker 118, stored in a computer-readable medium 108 of a computing device of distributed computing system 128, etc. The determined response may include a list of one or more dataset IDs and/or a number of members responsive to the overlap request.

In an operation 226, a determination is made concerning whether processing is stopped. When processing is stopped, processing continues in operation 228. When processing is not stopped, processing continues in operation 220 to wait for receipt of another member overlap query. A received indicator may indicate that processing is stopped. For example, a user may issue a stop or exit command.

In operation 228, the created summary data and/or the created intersection data may be stored in aggregate data 126 for subsequent use in generating additional member overlap query responses. The determined response(s) may further be stored in aggregate data 126 in combination with the respective member overlap query.

Because the created intersection data is small and does not include any of the remaining variables associated with each observation vector, the created intersection data can be cached in an edge computing node, to make visualization of member overlap query results much more responsive. The created intersection data can further be more optimally queried in-memory or in a relational database.

To illustrate the query processing time improvement, a series of queries were performed in a typical existing manner without using the created intersection data or the created summary data and using the created intersection data or the created summary data. The respective query processing times were captured for comparison. Input datasets 124 included 44 datasets. A maximum number of members of the input datasets 124 was 3,147,774 members, and a total number of unique members across the 44 datasets was 7,770,137. An average number of members across the 44 datasets was 273,882 with a standard deviation of 586,485. Creating the summary data using the SQL provided above required a scan of 425.36 megabytes of data and a query processing time of 5.19 seconds. Creating the intersection data using the SQL provided above required a scan of 425.36 megabytes of data and a query processing time of 6.14 seconds. The creation of the summary data and the creation of the intersection data is an additional step performed by membership query application 122 that is not performed by existing query processing methods. However, use of the created intersection data significantly improves the processing time of subsequent member overlap queries regarding input datasets 124.

For example, for a first member overlap query to identify the 10 datasets of input datasets 124 that have the most overlap, a scan of 850.45 megabytes of data and a query processing time of 5.3 seconds was required without using the created intersection data. For illustration, the SQL code executed was

```
select dataset_id, count(distinct(cc)), count(distinct(pair))
    other datasets from (
    select f.dataset_id, s.dataset_id as pair, f.user_id as cc
        from membership_all f, membership_all s
        where f.dataset_id !=s.dataset_id
        and f.user_id=s.user_id)
    ) gg
    group by 1
    order by 2 desc, 3 desc;
```

In comparison, using membership query application 122 and the created intersection data, a scan of 1.8 megabytes of data and a query processing time of 1.06 seconds was required, which is five times faster and required a scan of ~472 times fewer megabytes of data. For illustration, the SQL code executed was

```
select ss.dataset_id,
    sum(unique_member_count) as common_members,
    sum(si.dataset_group_size) as for_score
from dataset_list ss, intersection_data si
where contains(si.dataset_group, ss.dataset_id)=true and
    si.dataset_group_size>1
group by 1
order by common_members desc
limit 10;
```

For example, for a second member overlap query to identify the 10 datasets of input datasets 124 that have the least or no overlap, a scan of 850.45 megabytes of data and a query processing time of 5.3 seconds was required without using the created intersection data. For illustration, the SQL code executed was

```
select dataset_id, count(distinct(cc)) as common_members,
    count(distinct(pair)) for_score
from (select f.dataset_id, s.dataset_id as pair, f.user_id as cc
    from membership_all f, membership_all s
    where f.dataset_id !=s.dataset_id
    and f.user_id=s.user_id)
    ) gg
group by 1
order by 2, 3 desc
limit 10;
```

In comparison, using membership query application 122 and the created intersection data, a scan of 1.8 megabytes of data and a query processing time of 0.95 seconds was required, which is 5.58 times faster and required a scan of ~472 times fewer megabytes of data. For illustration, the SQL code executed was

```
select ss.dataset_id,
    sum(unique_member_count) as common_members,
    sum(si.dataset_group_size) as for_score
from dataset_list ss, intersection_data si
where contains(si.dataset_group, ss.dataset_id)=true and
    si.dataset_group_size>1 group by 1
order by for_score, common_members desc
limit 10;
```

For example, for a third member overlap query to identify the 5 datasets of input datasets 124 that have the most overlap with datasets 7, 13, and 14, a scan of 425 megabytes of data and a query processing time of 3.25 seconds was required without using the created intersection data. For illustration, the SQL code executed was

```
select dataset_id, count(*) as matching_member
from membership_all
where user_id in (select user_id from membership_all
    where dataset_id='7'
    intersect
    select user_id from membership_all where
        dataset_id='13'
    intersect
    select user_id from membership_all where
        dataset_id='14')
and dataset_id not in ('7','13', '14')
group by 1
order by 2 desc
```

In comparison, using membership query application 122 and the created intersection data, a scan of 0.082 megabytes of data and a query processing time of 1.37 seconds was required, which is 2.32 times faster and required a scan of ~5183 times fewer megabytes of data. For illustration, the SQL code executed was

```
select other.dataset_id, sum(unique_member_count) as common_members
from dataset_list other, intersection_data si
where contains(si.dataset_group, other.dataset_id)=true
and contains(dataset_group,13)=true and
    contains(dataset_group,7)=true and contains(dataset_group,14)=true
and other.dataset_id not in (13,7,14)
group by 1
order by 2 desc
limit 5
```

For example, for a fourth member overlap query to identify the number of overlapping members between datasets 7, 13, and 14, a scan of 145 megabytes of data and a query processing time of 2.75 seconds was required without using the created intersection data. For illustration, the SQL code executed was

```
select 'AB' AS grp, common_members
from (SELECT count(user_id) AS common_members
    from (SELECT user_id from membership_all WHERE
        dataset_id='7'
    intersect SELECT user_id from membership_all WHERE
        segment_id='14'))
UNION ALL
SELECT 'BC' AS grp, common_members
from (SELECT count(user_id) AS common_members
    from (SELECT user_id from membership_all WHERE
        dataset_id='14'
    intersect SELECT user_id from membership_all WHERE
        dataset_id='13'))
UNION ALL
SELECT 'AC' AS grp, common_members
from (SELECT count(user_id) AS common_members
    from (SELECT user_id from membership_all WHERE
        dataset_id='7'
    intersect SELECT user_id from membership_all WHERE
        dataset_id='13'))
UNION ALL
SELECT 'ABC' AS grp, common_members
from (SELECT count(user_id) AS common_members
    from (SELECT user_id from membership_all WHERE
        dataset_id='13'
    intersect SELECT user_id from membership_all WHERE
        dataset_id='7'
    intersect SELECT user_id from membership_all WHERE
        dataset_id='14'))
```

In comparison, using membership query application 122 and the created intersection data, a scan of 0.000263 megabytes of data and a query processing time of 0.78 seconds was required, which is 3.5 times faster and required a scan of ~551,330 times fewer megabytes of data. For illustration, the SQL code executed was

```
select 'AB' as grp, sum(unique_member_count) as common_members
from intersection_data where contains(dataset_group,7)=true
and contains(dataset_group,13)=true
union all
select 'BC' as grp, sum(unique_member_count) as common_members
from intersection_data where contains(dataset_group, 13)= true
and contains(dataset_group,14)=true
```

```
union all
  select 'AC' as grp, sum(unique_member_count) as com-
      mon_members
  from intersection_data where contains(dataset_group,7)
      =true
  and contains(dataset_group,14)=true
union all
  select 'ABC' as grp, sum(unique_member_count) as com-
      mon_members
  from intersection_data where contains(dataset_group,7)
      =true
  and contains(dataset_group,13)=true
  and contains(dataset_group,14)=true
```

For example, for a fifth member overlap query to identify the number of overlapping members between datasets 3, 31, and 36, a scan of 651 megabytes of data and a query processing time of 3.72 seconds was required without using the created intersection data. In comparison, using membership query application 122 and the created intersection data, a scan of 0.000263 megabytes of data and a query processing time of 0.91 seconds was required, which is four times faster and required a scan of ~2,475,285 times fewer megabytes of data. For illustration, the SQL code executed was the same as that shown above replacing datasets 7, 13, and 14, with datasets 3,31, and 36.

For example, for a sixth member overlap query to identify a total number o unique members of input datasets 124, a scan of 413.29 megabytes of data and a query processing time of 3.4 seconds was required without using the created intersection data. For illustration, the SQL code executed was "select count(distinct(user_id)) from membership_all".

In comparison, using membership query application 122 and the created intersection data, a scan of 0.0000128 megabytes of data and a query processing time of 0.61 seconds was required, which is 5.57 times faster and required a scan of ~32,288,28 times fewer megabytes of data. For illustration, the SQL code executed was "select sum(unique_member_count) as total_unique_members from intersection_data".

Table 5 below shows a summary of the comparative results where "Without" indicates processing without using membership query application 122, and "With" indicates processing using membership query application 122.

TABLE 5

| | Data scanned (Mb) | | | Processing time (seconds) | | |
|---|---|---|---|---|---|---|
| Query | Without | With | Improvement | Without | With | Improvement |
| 1 | 850.45 | 1.8 | 472× | 5.3 | 1.06 | 5× |
| 2 | 850.45 | 1.8 | 472× | 5.3 | 0.95 | 5.58× |
| 3 | 425 | 0.082 | 5,183× | 3.25 | 1.37 | 2.32× |
| 4 | 145 | 0.000263 | 551,330× | 2.75 | 0.78 | 3.5× |
| 5 | 651 | 0.000263 | 2,475,285× | 3.72 | 0.91 | 4× |
| 6 | 413.29 | 0.0000128 | 32,288,281× | 3.4 | 0.61 | 5.57× |

The member overlap query can be for identifying groups with specific needs, which may be of interest to Government agencies, such as Access to Healthcare, vaccination, internet access, etc. For example, if input datasets 124 include various demographic, geographic, and relevant variables for a large population size, they can be cross analyzed to determine segments that have a specific affinity to other segments. A segment of the population may have a desired outcome, and it may be desired to identify attributes that are of significance to the outcome. For illustration, in a drug efficacy test, a drug X prescribed for a medical condition Y may have a success rate score for different percentage bands. A comparison can be made with all of the datasets to understand a correlation between the datasets based on overlapping population to help identify groups for further study or to help in a decision making process among drugs in combination and their effects on certain medical condition. The response to the member overlap query can be used as a feed for a machine learning model training step, where a degree of overlap for a given dataset is an input variable for the dataset and a membership of datasets are changing at a slower rate than the input variables. The system for calculation of score can be separated from machine learning model training system and retrieved as a real-time lookup during machine learning model training, making training faster.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   create a list of unique member identifiers included in a plurality of datasets;
   define a list of datasets of the plurality of datasets for each unique member identifier of the created list of unique member identifiers, wherein each dataset included in the list of datasets for each respective unique member identifier includes a respective unique member associated with a respective unique member identifier;
   define a unique list of datasets from each list of datasets defined for the created list of unique member identifiers;
   determine a number of occurrences of each defined unique list of datasets;
   determine a number of datasets included in each unique list of datasets;
   create intersection data that includes a dataset list of each defined unique list of datasets in association with the determined number of occurrences of each respective, defined unique list of datasets and with the determined number of datasets included in each respective, defined unique list of datasets;
   determine an overlap response to a member overlap query related to the plurality of datasets using the created intersection data; and
   output the determined overlap response.

2. The non-transitory computer-readable medium of claim 1, wherein the defined list of datasets for a unique member identifier of the created list of unique member identifiers includes a single dataset.

3. The non-transitory computer-readable medium of claim 1, wherein each unique member identifier is unique to each unique member of the plurality of datasets and is consistently used across each dataset of the plurality of datasets to match common members of the plurality of datasets.

4. The non-transitory computer-readable medium of claim 1, wherein, before defining the list of datasets, the computer-readable instructions further cause the computing device to assign a unique dataset identifier to each dataset of the plurality of datasets, wherein the list of datasets includes the unique dataset identifier assigned to a respective dataset.

5. The non-transitory computer-readable medium of claim 1, wherein, before executing the member overlap query, the computer-readable instructions further cause the computing device to:
  determine a number of unique members of each dataset of the plurality of datasets; and
  create summary data that includes a unique dataset identifier in association with the number of unique members of each respective dataset of the plurality of datasets,
  wherein the member overlap query is further executed using the created summary data.

6. The non-transitory computer-readable medium of claim 5, wherein the computer-readable instructions further cause the computing device to output the created summary data.

7. The non-transitory computer-readable medium of claim 1, wherein the defined overlap response includes a unique dataset identifier of at least one dataset of the plurality of datasets.

8. The non-transitory computer-readable medium of claim 1, wherein the defined overlap response includes a number of unique members.

9. The non-transitory computer-readable medium of claim 1, wherein the computer-readable instructions further cause the computing device to output the created intersection data.

10. The non-transitory computer-readable medium of claim 1, wherein the overlap response is determined using a database engine.

11. The non-transitory computer-readable medium of claim 1, wherein the member overlap query relates to a request to determine common members between at least two of the plurality of datasets.

12. A computing device comprising:
  a processor; and
  a non-transitory computer-readable medium operably coupled to the processor, the computer-readable medium having computer-readable instructions stored thereon that, when executed by the processor, cause the computing device to
    create a list of unique member identifiers included in a plurality of datasets;
    define a list of datasets of the plurality of datasets for each unique member identifier of the created list of unique member identifiers, wherein each dataset included in the list of datasets for each respective unique member identifier includes a respective unique member associated with a respective unique member identifier;
    define a unique list of datasets from each list of datasets defined for the created list of unique member identifiers;
    determine a number of occurrences of each defined unique list of datasets;
    determine a number of datasets included in each unique list of datasets;
    create intersection data that includes a dataset list of each defined unique list of datasets in association with the determined number of occurrences of each respective, defined unique list of datasets and with the determined number of datasets included in each respective, defined unique list of datasets;
    determine an overlap response to a member overlap query related to the plurality of datasets using the created intersection data; and
    output the determined overlap response.

13. The computing device of claim 12, wherein each unique member identifier is unique to each unique member of the plurality of datasets and is consistently used across each dataset of the plurality of datasets to match common members of the plurality of datasets.

14. The computing device of claim 12, wherein, before defining the list of datasets, the computer-readable instructions further cause the computing device to assign a unique dataset identifier to each dataset of the plurality of datasets, wherein the list of datasets includes the unique dataset identifier assigned to a respective dataset.

15. The computing device of claim 12, wherein the defined overlap response includes a unique dataset identifier of at least one dataset of the plurality of datasets.

16. The computing device of claim 12, wherein the defined overlap response includes a number of unique members.

17. The computing device of claim 12, wherein the computer-readable instructions further cause the computing device to output the created intersection data.

18. The computing device of claim 12, wherein the overlap response is determined using a database engine.

19. The computing device of claim 12, wherein the member overlap query relates to a request to determine common members between at least two of the plurality of datasets.

20. A method of responding to a membership overlap query, the method comprising:
  creating, by a computing device, a list of unique member identifiers included in a plurality of datasets;
  defining, by the computing device, a list of datasets of the plurality of datasets for each unique member identifier of the created list of unique member identifiers, wherein each dataset included in the list of datasets for each respective unique member identifier includes a respective unique member associated with a respective unique member identifier;
  defining, by the computing device, a unique list of datasets from each list of datasets defined for the created list of unique member identifiers;
  determining, by the computing device, a number of occurrences of each defined unique list of datasets;
  determining, by the computing device, a number of datasets included in each unique list of datasets;
  creating, by the computing device, intersection data that includes a dataset list of each defined unique list of datasets in association with the determined number of occurrences of each respective, defined unique list of datasets and with the determined number of datasets included in each respective, defined unique list of datasets;
  determining, by the computing device, an overlap response to a member overlap query related to the plurality of datasets using the created intersection data; and outputting, by the computing device, the determined overlap response.

21. The method of claim 20, wherein the defined list of datasets for a unique member identifier of the created list of unique member identifiers includes a single dataset.

22. The method of claim 20, wherein each unique member identifier is unique to each unique member of the plurality of datasets and is consistently used across each dataset of the plurality of datasets to match common members of the plurality of datasets.

23. The method of claim 20, further comprising, before defining the list of datasets, assigning, by the computing device, a unique dataset identifier to each dataset of the plurality of datasets, wherein the list of datasets includes the unique dataset identifier assigned to a respective dataset.

24. The method of claim 20, further comprising, before executing the member overlap query:
   determining, by the computing device, a number of unique members of each dataset of the plurality of datasets; and
   creating, by the computing device, summary data that includes a unique dataset identifier in association with the number of unique members of each respective dataset of the plurality of datasets,
   wherein the member overlap query is further executed using the created summary data.

25. The method of claim 24, further comprising outputting, by the computing device, the created summary data.

26. The method of claim 20, wherein the defined overlap response includes a unique dataset identifier of at least one dataset of the plurality of datasets.

27. The method of claim 20, wherein the defined overlap response includes a number of unique members.

28. The method of claim 20, further comprising outputting, by the computing device, the created intersection data.

29. The method of claim 20, wherein the overlap response is determined using a database engine.

30. The method of claim 20, wherein the member overlap query relates to a request to determine common members between at least two of the plurality of datasets.

* * * * *